United States Patent
Nagata et al.

[19]

[11] Patent Number: 6,005,313

[45] Date of Patent: Dec. 21, 1999

[54] SPINDLE MOTOR

[75] Inventors: Akihiro Nagata; Shinji Kinoshita, both of Nagano, Japan

[73] Assignee: Sankyo Seiki Mfg. Co., Ltd., Nagano-ken, Japan

[21] Appl. No.: 09/013,880

[22] Filed: Jan. 27, 1998

[30] Foreign Application Priority Data

May 28, 1997 [JP] Japan .................................. 9-138070

[51] Int. Cl.$^6$ .................................................. H02K 7/00
[52] U.S. Cl. .......................................... 310/67 R; 310/91
[58] Field of Search ................................. 310/67 R, 90, 310/91; 360/99.08

[56] References Cited

U.S. PATENT DOCUMENTS

| | | | |
|---|---|---|---|
| 4,965,476 | 10/1990 | Lin | 310/51 |
| 5,128,571 | 7/1992 | Itsu | 310/67 R |
| 5,157,295 | 10/1992 | Stefansky et al. | 310/90 |
| 5,227,686 | 7/1993 | Ogawa | 310/90 |
| 5,402,023 | 3/1995 | Nakanishi et al. | 310/90 |
| 5,528,092 | 6/1996 | Ohta | 310/67 R |

FOREIGN PATENT DOCUMENTS 8-203203   9/1996   Japan ..................................... 384/478

*Primary Examiner*—Nestor Ramirez
*Assistant Examiner*—Joseph Waks
*Attorney, Agent, or Firm*—McAulay Nissen Goldberg Kiel & Hand, LLP

[57] ABSTRACT

A spindle motor has a fixed member of a motor, a rotor rotatably supported with respect to the fixed member, a shaft provided on either the fixed member or the rotor, a first ball bearing fitted on a head side of the shaft and a second ball bearing fitted on a base side of the shaft and having an axial dimension larger than an axial dimension of the first ball bearing. A circumferential wall, preferably on the fixed member, has a small gap with an outer circumferential wall of an outer ring of the second ball bearing.

5 Claims, 3 Drawing Sheets

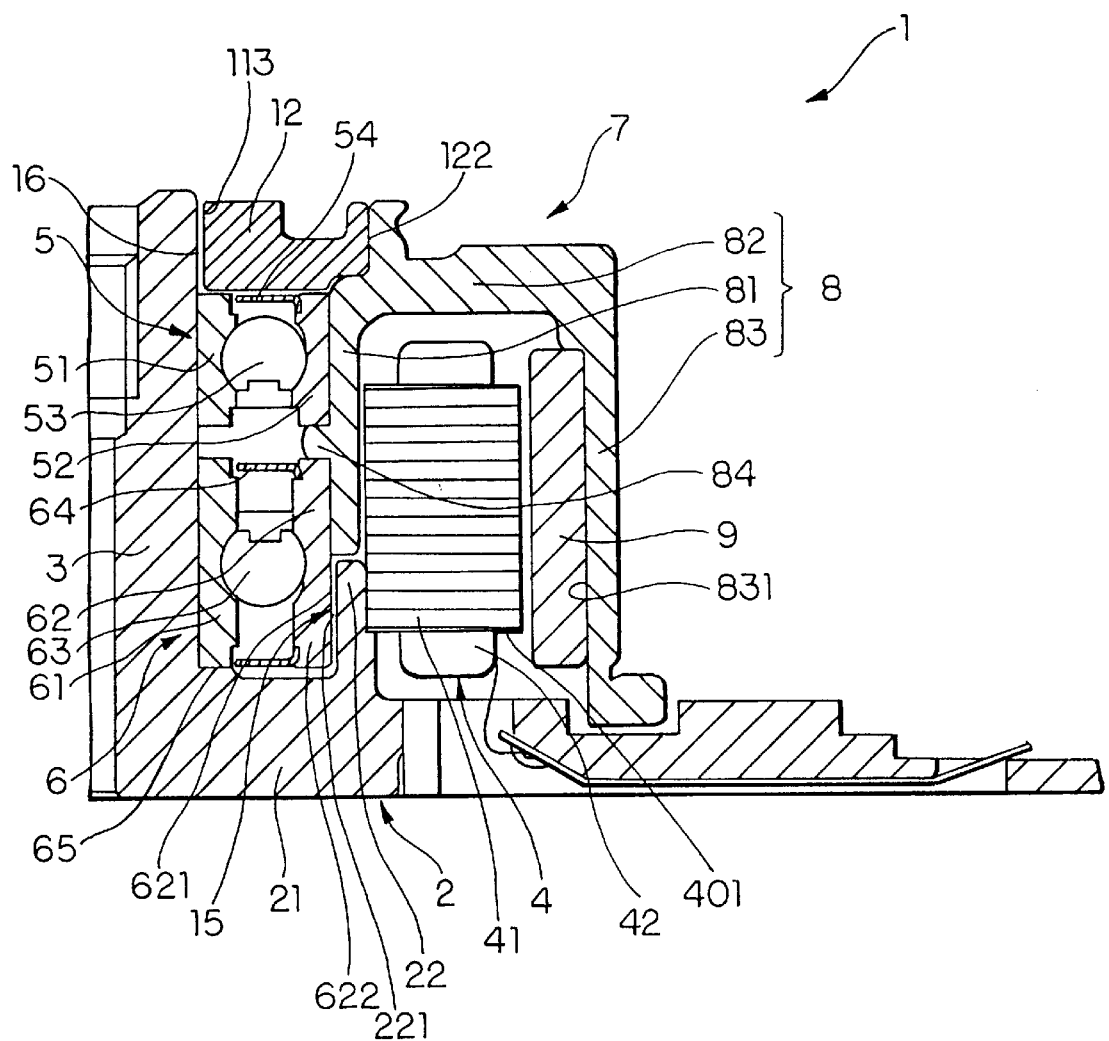
F I G. 1

SPINDLE MOTOR

BACKGROUND OF THE INVENTION a) Field of the Present Invention

The present invention relates to a spindle motor for turning disk-like bodies to be turned, such as magnetic disks.

b) Description of the Related Art

Spindle motors have been used for turning disk-like bodies to be turned, such as magnetic disks. Known as a spindle motor is a fixed-shaft type spindle motor in which a hub is rotatably supported with respect to a shaft via a pair of ball bearings. A rotary-shaft type spindle motor is also known, in which hub and shaft are rotatably supported via a pair of ball bearings with respect to a fixed member of the motor.

In the spindle motor, particles such as oil mists may come outside from the ball bearings, which may spoil the body to be turned. For example, if particles attach onto a magnetic disk and the like, signals cannot be properly reproduced from or recorded on a recording surface of the magnetic disk.

To avoid such situations, the present applicant, then, filed a prior application of a spindle motor having a labyrinth sealing structure with which particles are prevented from escaping outside. The labyrinth sealing structure has been disclosed in Tokkai H8-203203. The spindle motor comprises a pair of ball bearings fitted to a shaft (fixed shaft) standing on a motor frame and a hub rotatably supported with respect to the shaft via the ball bearings. Between an outer ring of the ball bearing placed on the motor frame side and a cylindrical projection vertically standing on the bottom wall of the motor frame, a small gap is configured as a labyrinth sealing structure. A pair of the ball bearings used here are the same in axial dimension.

Prominently used for 2.5-inch and 3.5-inch magnetic disks, apparatus for driving bodies to be turned have rapidly advanced so as to be more compact and thinner. This trend requires spindle motors to be thinner. If the axial dimension of the ball bearing is simply shortened to make a thin motor, however, although a bearing span, a distance between the upper and lower ball bearings, can be sufficiently obtained to some extent depending on fixing positions thereof, the axial dimension of a labyrinth sealing structure configured between the outer ring of the ball bearing and the cylindrical protrusion formed on the frame is shortened, degrading sealing performance against the escape of particles. In addition, if ball bearings having a long axial dimension are used on both upper and lower positions to prevent the sealing performance from being degraded, not only the thickness of the motor is affected, but also the bearing span between the top and bottom ball bearings is shortened. Consequently, rotational precision of the motor is degraded, and the natural frequency of a motor is decreased to easily generate noise.

OBJECT AND SUMMARY OF THE INVENTION

Considering the above problems, a primary object of the present invention is to improve the design and construction of a spindle motor in which the axial dimension of the labyrinth sealing structure is sufficient to prevent particles from escaping outside, in which the bearing span is maintained long enough to prevent motor properties from greatly being degraded, and in which the motor itself is made thin.

In accordance with the invention, a spindle motor comprises a fixed member of a motor, a rotor rotatably supported with respect to the fixed member, a shaft provided on either the fixed member or the rotor, a first ball bearing fitted on a head side of the shaft and a second ball bearing fitted on a base side of the shaft and having an axial dimension larger than an axial dimension of the first ball bearing. A circumferential wall, preferably on the fixed member, has a small gap with an outer circumferential wall of an outer ring of the second ball bearing.

BRIEF DESCRIPTION OF THE DRAWINGS

In the drawings:

FIG. 1 illustrates a cross-sectional view of a fixed-shaft-type spindle motor to which the present invention is applied;

DESCRIPTION OF THE PREFERRED EMBODIMENTS

Figures 2A, 2B:
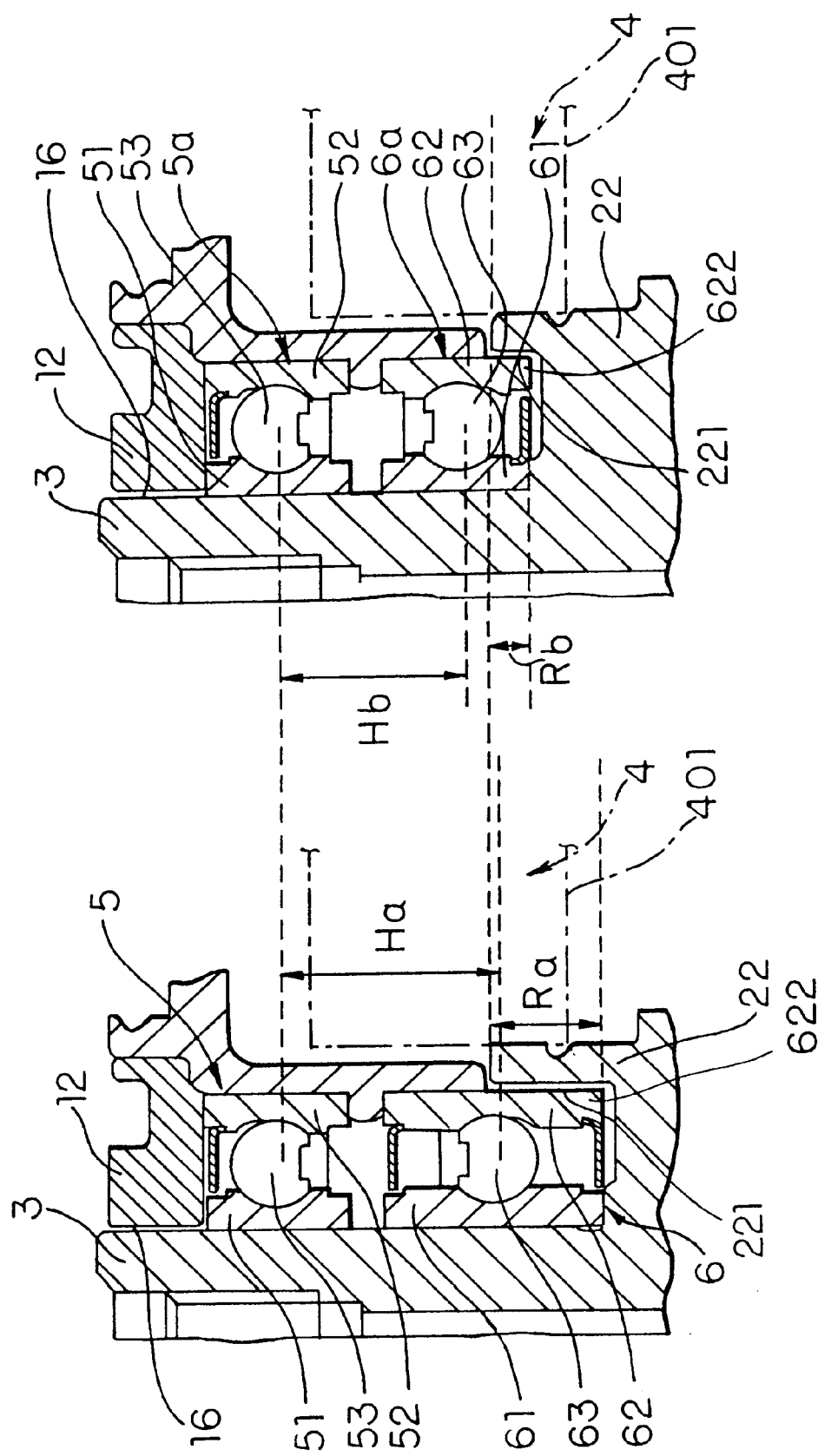
FIGS. 2(A) and (B) illustrates changes in bearing span and small gap according to an axial dimension of ball bearings.

A spindle motor to which the present invention is applied will be described hereinafter referring to the drawings.

EMBODIMENT 1

FIG. 1 is a cross-sectional view of an example of a spindle motor for driving disks to which the present invention is applied.

A spindle motor 1 comprises a motor frame 2 as a fixed member and a fixed shaft 3 which stands at the center area of a dish-like bottom portion 21 of the motor frame 2. The fixed shaft 3 is integrally molded with the motor frame 2. At the bottom portion 21 of the motor frame 2, a vertically standing cylindrical protrusion 22 is provided as a single unit such that it coaxially surrounds the fixed shaft 3. A stator core 4 is secured around an outer circle of the cylindrical protrusion 22. The stator core 4 is positioned at a predetermined height from the bottom portion 21 of the motor frame 2 such that an inner peripheral portion of the bottom surface 401 of the stator core 4 is held on an annular step formed around the outer circumferential surface of the cylindrical protrusion 22. A plurality of salient-poles 41 projecting outward in a radius direction are paced by a constant interval on the stator core 4. A drive coil 42 is wound around each of the salient-poles 41.

A first ball bearing 5 is installed on the head side of the fixed shaft 3 and a second ball bearing 6 is installed on the base side of the fixed shaft 3. Each of the first and second ball bearings 5, 6 respectively has inner ring 51, 61, outer ring 52, 62, and ball 53, 63 which is inserted between the rings and freely rolls in between. Each inner ring 51, 61 is adhered to the fixed shaft 3 such that the outer circumferential wall thereof is used for adhering. Each outer ring 52, 62 is adhered to the inner circumferential wall of a base portion 81 of the hub 8, which constitutes a rotor 7. Note that the outer ring 62 of the second ball bearing 6 is fixed such that only about axially half portion of the outer circumferential wall is adhered to the inner circumferential wall of the base portion 81 of the hub 8 to be described later. With this configuration, the rotor 7 is rotatably supported with respect to the fixed shaft 3 via each ball bearing 5, 6.

In the first ball bearing 5, an annular sealing member 54 is installed at the top position of the inner circle of the outer ring 52 to substantially close a space between the inner and outer rings 51 and 52. Also, in the second ball bearing 6, annular sealing members 64 and 65 are installed at top and bottom positions of the inner circle of the outer ring 62 to substantially close a space between the inner and outer rings 61 and 62.

The rotor 7 has the hub 8 on which a body to be turned, such as disk, is loaded. The hub 8 has the cylindrical base portion 81 having a shaft hole inside thereof, a level portion 82 projecting outward in a radius direction from the upper area of the base portion 81, and a cylindrical portion 83 which is bent downward at the periphery of the level portion 82 and equipped with a disk loading portion 83a on the bottom side. A step portion 84 is provided on the inner circumferential surface of the base portion 81 for maintaining a constant distance between the ball bearings 5 and 6. With the step portion 84, the distance between the ball bearings 5 and 6, that is, the shortest distance is determined. The cylindrical portion 83 of the hub 8 coaxially surrounds the stator core 4 and a ring-like drive magnet 9 is fixed on the inner circumferential wall 831 of the cylindrical portion 83. The inner circumferential wall of the drive magnet 9 faces the stator core 4. By conducting a drive coil 42 wound around each of the salient-poles 41 of the stator core 4, a magnetic force is generated between the drive magnet 10 and each of the salient poles 41, and the hub 8 is rotated thereby.

On the base portion 81 of the hub 8, the annular sealing member 12 is provided at the position on the head side of the fixed shaft 2 above the first ball bearing 5 so that an annular space formed between the fixed shaft 3 and the base portion 81 is closed thereby. The outer circumferential wall 122 of the sealing member 12 is tightly adhered to the inner circumferential wall of the base portion 81 of the hub 8 so that the sealing member 12 rotates together with the hub 8. Also, the inner surface 123 of the sealing member 12 faces the outer surface of the fixed shaft 3 with a small gap of about 10 μm–100 μm to constitute a labyrinth sealing structure 16.

In the spindle motor 1, a vertically extending small gap 15 of about 10 μm–100 μm is constituted between inner circle surface 221 of the cylindrical protrusion 22 standing on the motor frame 2 and the lower side of the outer circumferential wall 621 of the outer ring 62 of the lower ball bearing 6. The small gap 15 is communicated with a space, in which the ball 63 of the lower ball bearing 6 is held, and also communicated with a space, in which the stator core 4 is installed (a space communicating with the outside), to constitute a labyrinth sealing structure. With the labyrinth sealing structure, particles such as oil mists generated in the first and second ball bearings 5 and 6 are prevented from escaping outside.

While the balls 53 and 63 of the first and second ball bearings 5 and 6 are the same in diameter, the axial dimension of the second ball bearing 6 is longer than that of the first ball bearing 5. For example, the axial dimension of the inner and outer rings 51, 52 of the first ball bearing 5 is about 2.6 mm, which occupies about 20 percent of the entire height of the motor. On the other hand, the axial dimension of the inner and outer rings 61, 62 of the second ball bearing 6 is about 4.0 mm, which occupies about 30 percent of the entire height of the motor. It is about 1.5 times of the axial dimension of the inner and outer rings 51, 52 of the second ball bearing 5. By setting the axial dimension of the second ball bearing 6 longer than that of the first ball bearing 5 in this manner, the labyrinth sealing structure can be maintained long enough to prevent particles generated from the ball bearings 5 and 6 from escaping outside.

The circumferential wall 221 of the motor frame 2 is configured to be the inner circumferential wall of the cylindrical protrusion 22 to which the stator core 4 is fitted, and the bottom surface 622 of the second ball bearing 6 is positioned lower than the bottom surface 401 of the stator core 4. In other words, although the second ball bearing 6 is larger in the axial dimension than the ball bearing 5, it is extended downward inside the circumferential wall 22. Therefore, although the axial dimension of the second ball bearing 6 is larger than that of the first ball bearing 5, the entire height of the motor is maintained short.

The circumferential wall 22 of the motor frame 2 is extended such that the top end thereof is axially as high as the center of the second ball bearing 6. In other words, the bottom half of the outer circumferential wall 621 of the outer ring 62 of the second ball bearing 6 functions as a circumferential wall for constituting the small gap 15, and the top half thereof functions as an adhering surface with the inner circumferential wall 621 of the base portion 81 of the hub 8. For this reason, the top half of the outer circumferential wall 621 of the outer ring 62 of the second ball bearing 6 can obtain a sufficient length as the adhering portion with the hub 8, and the axial length of the small gap 15 constituting the labyrinth sealing structure can also be sufficiently obtained. In particular, by configuring the axial dimension of the second ball bearing 6 to be 1.5 times longer than the axial dimension of the first ball bearing 5, the bonding area to the base portion 81 of the hub 8 can be sufficiently obtained as well as the axial dimension of the small gap 15, enabling to prevent particles from escaping outside the spindle motor 1.

Next described referring to the drawing FIG. 2 are: the bearing span, Hb, and axial length, Rb, of the small gap 15 when, as illustrated in FIG. 2(B), ball bearing 5a, 5b are the same in axial length; the bearing span, Ha, and the axial length, Ra, of the small gap 15 when, as illustrated in FIG. 2(A), the axial dimension of the second ball bearing 6 is larger than that of the first ball bearing 5. Note that the ball bearings 5, 5a, 6a are the same in axial dimension.

As shown in FIG. 2(A), the axial dimension of the second ball bearing 6 is made larger than that of the first ball bearing 5 while the position of the top surface of the inner and outer rings of the second ball bearing 6 is maintained the same as the position of the top surface of the inner and outer rings of the second ball bearing 6a illustrated in FIG. 2(B). With this configuration, the position of the bottom surface 622 of the second ball bearing 6 shifts downward according to the axial dimension of the ball bearing 6. For this reason, the axial dimension of the area where the circumferential wall 221 of the cylindrical protrusion 22 formed on the motor frame 2 faces the outer circumferential wall 621 of the outer ring 62 of the second ball bearing 6 can be maintained long. In other words, the axial length, Ra, of the small gap 15 constituted between those circumferential surfaces 221 and 621 can be maintained long, compared to the axial length, Rb, of the small gap when, as illustrated in FIG. 2(B), the ball bearings 5a and 6a are the same in axial length.

Also, as shown in FIG. 2(A), the axial dimension of the second ball bearing 6 is made longer than that of the first ball bearing 5 while maintaining the same positions for the top surfaces of the second ball bearing 6 and second ball bearing 6a of FIG. 2(B). With this configuration, the position of the ball 63 of the second ball bearing 6 shifts downward according to the axial dimension of the ball bearing 6. For this reason, the bearing span, that is, the distance, Ha, between the centers of the balls 53 and 63 of the ball bearings 5 and 6 can be made long, compared to the bearing span, Hb, measured when the ball bearings 5a and 6a are the same in axial length as shown in FIG. 2(B).

As described above, in the spindle motor 1 of this embodiment, the axial dimension of the second ball bearing 6 having the outer ring 62 which constitutes the small gap 15 is made larger than that of the first ball bearing 5. Therefore, while the space occupied by the first and second ball bearings 5 and 6 is minimized, the small gap 15, which is constituted between the circumferential wall 22 of the motor frame 2 and the outer ring 62 of the second ball bearing 6 to provide labyrinth sealing effects, can be maintained long. Consequently high sealing performance can be maintained to prevent particles such as oil mists generated in the ball bearings 5 and 6 from escaping outside. In addition, the bearing span, Ha, between the first and second ball bearings 5 and 6 can be maintained long, restraining the degrade of the rotary precision of the motor and the generation of nose, which is normally caused by the decrease of the natural frequency of a motor. Therefore, a spindle motor, in which particles are excellently prevented from escaping outside and the motor property is not greatly degraded because of making the motor thin, can be provided. As a result, a thin spindle motor which can be installed in 2.5-inch- and 3.5-inch- magnetic disk apparatus can be practically manufactured.

EMBODIMENT 2

Figure 3:
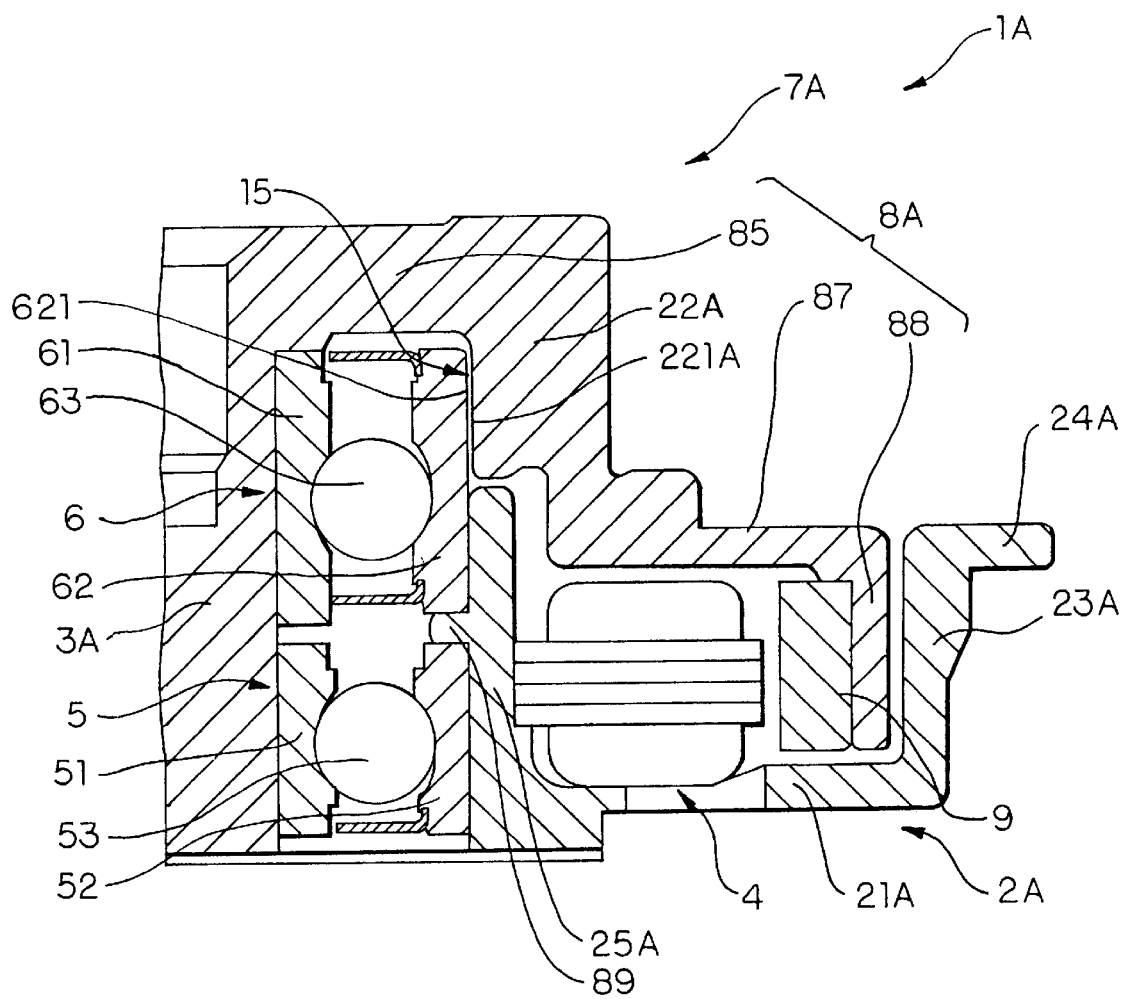
FIG. 3 illustrates a cross-sectional view of a rotary-shaft-type spindle motor to which the present invention is applied.

FIG. 3 is a cross-sectional view of an example of a rotary-shaft-type spindle motor to which the present invention is applied. Note that the portions having the common functions in the rotary-shaft-type spindle motor are coded the same as those in the spindle motor of Embodiment 1 and their descriptions are therefore omitted.

As illustrated in FIG. 3, a rotary-shaft-type spindle motor 1A comprises a motor frame 2A as a fixed member and a rotor 7A rotatably supported with respect to the motor frame 2A. The motor frame 2A has a dish-like bottom portion 21A, a cylindrical portion 25A formed on the bottom portion 21A, a circumferential wall 23A standing at the periphery of the bottom portion 21A, and an annular flange portion 24A projecting outwardly in a radius direction from the top edge of the circumferential wall 23A. The outer circumference of the cylindrical portion 25A is used for mounting a stator core 4, and the stator core 4 is secured thereto. In Embodiment 2, a step is formed at the outer circumference of the cylindrical portion 25A to hold the inner periphery of the bottom surface of the stator core 4 and determine the position of the stator core 4 at a predetermined height with respect to the motor frame 2A.

The rotor 7A has a rotary shaft 3A inserted into the cylindrical portion 25A of the motor frame 2A and a hub 8A which can be turned together with the rotary shaft 3A. The hub 8A has a dish-like top table 85, a cylindrical protrusion 22A extending downward from the periphery of the top table 85, a level portion 87 projecting outwardly in a radius direction from the bottom of the cylindrical protrusion 22A, and a cylindrical portion 88 extending downward from the periphery of the level portion 87. The rotary shaft 3A and hub 8A are integrally molded such that the rotary shaft 3A projects downward from the center of the top table 85 of the hub 8A.

In the same manner as the spindle motor 1 described in Embodiment 1, the first and second ball bearing 5 and 6 are fitted on the head and base sides of the rotary shaft 3A. The inner ring 51, 61 of each ball bearing 5, 6 is adhered to the rotary shaft 3A, and the outer ring 52, 62 is adhered to the inner circumferential wall of the cylindrical portion 25A. The rotary shaft 3A and hub 8A are rotatably supported with respect to the motor frame 2A via the ball bearings 5 and 6. The distance between the ball bearings 5 and 6 is determined by a step portion 89 formed on the inner circumferential surface of the cylindrical portion 25A.

The cylindrical portion 88 of the hub 8A coaxially surrounds the stator core 4, and a drive magnet 9 is bonded on the inner circumferential wall thereof. The drive magnet 9 and stator core 4 face each other.

Note that the level portion 87 of the hub 8A is used for loading a magnetic disk and the like, and by loading a body to be turned thereon, the body to be turned can be turned. Also, an annular flange portion 24A of the motor frame 2A is an installing portion to a main body of a disk drive (not illustrated).

In the spindle motor 1A, a vertically extending small gap 15 is constituted between the outer circumferential wall 621 of the outer ring 62 of the second ball bearing 6 positioned on the base side of the rotary shaft 3A and the circumferential wall 221A of the cylindrical protrusion 22A of the hub 8A. The small gap 15 communicates with a space to which the stator core 4 is fixed and a space in which the ball 63 of the second ball bearing 6 is installed, to constitute a labyrinth sealing structure.

The axial dimension of the second ball bearing 6 constituting the small gap 15 with the circumferential wall 221A of the hub 8A is larger than that of the first ball bearing 5. Therefore, even in the rotary-shaft-type spindle motor 1A in the same manner as the fixed-shaft-type spindle motor of Embodiment 1, while the space occupied by the first and second ball bearings 5 and 6 is minimized, the axial dimension of the small gap 15 configured between the outer circumferential wall 621 of the second ball bearing 6 and the circumferential wall 221A of the hub 8A can be maintained long. For this reason, high sealing performance can be maintained to prevent particles such as oil mists generated in the ball bearings from escaping outside. In addition, since the bearing span between the first and second ball bearings can be maintained long, degrading of the rotary precision of the motor can be suppressed as well as the noise generation, which is normally caused due to decreasing of the natural frequency of a motor. Therefore, a spindle motor can be provided, in which particles are excellently prevented from escaping outside and the motor property is not greatly degraded because of making motor thin. As a result, a thin spindle motor which can be installed in 2.5-inch- and 3.5-inch- magnetic disk apparatus can be practically manufactured.

As described above, in the spindle motor of the present invention, the axial dimension of the second ball bearing which constitutes a small gap for labyrinth sealing effects is made larger than the axial dimension of the first ball bearing. With this configuration, while the space occupied by the first and second ball bearings is minimized, the axial dimension of the small gap constituted between the outer ring of the second ball bearing and the circumferential wall can be maintained long. Therefore, high sealing performance can be maintained to prevent particles such as oil mists generated in the ball bearings from escaping outside. In addition, since the bearing span between the first and second ball bearings can be maintained long, degrading of the rotary precision of the motor can be restrained and the noise generation, which is normally caused due to decreasing of the natural frequency of a motor, can be restrained. Consequently, a spindle motor can be provided in which particles are prevented, in an excellent manner, from escaping outside and the motor properties are not greatly degraded while the motor is made thin.

While the foregoing description and drawings represent the preferred embodiments of the present invention, it will be obvious to those skilled in the art that various changes and modifications may be made therein without departing from the true spirit and scope of the present invention.

What is claimed is:

1. A spindle motor comprising:

a fixed member of said motor;

a fixed shaft standing on said fixed member;

a first ball bearing fitted on a head side of said fixed shaft;

a second ball bearing fitted on a base side of said fixed shaft and having an axial dimension larger than an axial dimension of said first ball bearing;

a hub rotatably supported around said fixed shaft via said ball bearings;

a circumferential wall provided on said fixed member so as to have a small gap with an outer circumferential wall of an outer ring of said second ball bearing, said circumferential wall being formed such that a top end thereof is positioned as high as an axially center position of said second ball bearing; and a stator core arranged on the circumferential wall, a bottom surface of said second ball bearing being positioned lower than a bottom surface of said stator core.

2. The spindle motor as set forth in claim 1 wherein said axial dimension of said second ball bearing is at least 1.5 times that of said axial dimension of said first ball bearing.

3. A spindle motor comprising:

a fixed member of said motor;

a hub for loading a body to be turned;

a rotary shaft extending from said hub toward said fixed member;

a first ball bearing fitted on a head side of said rotary shaft;

a second ball bearing fitted on a base side of said rotary shaft and having an axial dimension larger than an axial dimension of said first ball bearing; and a circumferential wall formed on said hub so as to have a small gap with an outer circumferential wall of an outer ring of said second ball bearing, said circumferential wall being formed such that a top end thereof is positioned as high as an axially center position of said second ball bearing.

4. The spindle motor as set forth in claim 3 wherein said axial dimension of said second ball bearing is at least 1.5 times that of said axial dimension of said first ball bearing.

5. The spindle motor as set forth in claim 3, wherein said fixed member has a cylindrical protrusion to which a stator core is fitted, and the top end of said cylindrical protrusion faces the top end of the circumferential wall, and said stator core is arranged between said first ball bearing and said second ball bearing in an axial dimension.

* * * * *